United States Patent
Kanamori et al.

(10) Patent No.: US 8,878,449 B2
(45) Date of Patent: Nov. 4, 2014

(54) LED DRIVE CIRCUIT AND LED ILLUMINATION UNIT

(71) Applicants: Atsushi Kanamori, Osaka (JP); Hirohisa Warita, Osaka (JP); Takayuki Shimizu, Osaka (JP)

(72) Inventors: Atsushi Kanamori, Osaka (JP); Hirohisa Warita, Osaka (JP); Takayuki Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 13/689,155

(22) Filed: Nov. 29, 2012

(65) Prior Publication Data

US 2013/0134895 A1    May 30, 2013

(30) Foreign Application Priority Data

Nov. 30, 2011    (JP) .................................. 2011-262481

(51) Int. Cl.
*H05B 37/02* (2006.01)
*H05B 33/08* (2006.01)

(52) U.S. Cl.
CPC .............. *H05B 37/02* (2013.01); *Y02B 20/347* (2013.01); *H05B 33/0851* (2013.01); *H05B 33/0815* (2013.01)
USPC ............ 315/226; 315/219; 315/291; 315/307

(58) Field of Classification Search
CPC ........... H05B 33/0815; H05B 33/0851; H05B 33/0845; H05B 33/0824; H05B 33/08; H05B 37/02; H05B 33/08099
USPC ............. 315/291, 224, 307, 200 R, 294, 201, 315/297, 210, 246, 185 R, 209 R, 219, 308
See application file for complete search history.

(56) References Cited

U.S. PATENT DOCUMENTS

| | | | |
|---|---|---|---|
| 2004/0100205 A1* | 5/2004 | Takahashi et al. | 315/248 |
| 2007/0182347 A1* | 8/2007 | Shteynberg et al. | 315/312 |
| 2010/0237790 A1* | 9/2010 | Peng | 315/210 |
| 2011/0057578 A1 | 3/2011 | Otake et al. | |
| 2011/0115399 A1* | 5/2011 | Sadwick et al. | 315/287 |
| 2011/0121754 A1 | 5/2011 | Shteynberg et al. | |
| 2011/0156612 A1 | 6/2011 | Kanamori et al. | |
| 2011/0175532 A1* | 7/2011 | Peng | 315/119 |
| 2011/0227484 A1 | 9/2011 | Huynh | |

FOREIGN PATENT DOCUMENTS

| | | |
|---|---|---|
| JP | 2005-26142 A | 1/2005 |
| JP | 2006-319172 A | 11/2006 |
| JP | 2011-54537 A | 3/2011 |
| JP | 2011-171042 A | 9/2011 |
| WO | WO 2011/084525 A1 | 7/2011 |

* cited by examiner

*Primary Examiner* — Thienvu Tran
*Assistant Examiner* — Christopher Lo
(74) *Attorney, Agent, or Firm* — Birch, Stewart, Kolasch & Birch, LLP

(57) ABSTRACT

There is provided an LED drive circuit that can be connected to an alternating-current power supply through a phase control dimmer and that drives an LED load, the LED drive circuit including: an LED current control circuit; a capacitance component and a resistance component that are connected in series between an input of the LED current control circuit and a reference potential; a switch element that is connected to both ends of the resistance component; and a switch control portion that turns off the switch element for a given period of time after a timing when the phase control dimmer is turned on and that turns on the switch element after the given period of time elapses.

8 Claims, 9 Drawing Sheets

LED DRIVE CIRCUIT AND LED ILLUMINATION UNIT

This application is based on Japanese Patent Application No. 2011-262481 filed in Japan on Nov. 30, 2011, the contents of which are hereby incorporated by reference.

BACKGROUND OF THE INVENTION

1. Field of the Invention

The present invention relates to an LED drive circuit and an LED illumination unit.

2. Description of the Related Art

LEDs have features such as a low current consumption and a long life; they are used not only for display devices but also for illumination devices and the like, and the number of the applications of LEDs is being increased. In an LED illumination device, in order to obtain a desired illumination, a plurality of LEDs are often used (for example, see JP-A-2006-319172).

A general illumination device often uses an AC 100V commercial power supply; with consideration given to a case, for example, where an LED illumination unit is used instead of a general illumination unit such as an incandescent bulb, as with the general illumination unit, the LED illumination unit preferably uses an AC 100V commercial power supply.

When light control is performed on an incandescent bulb, a phase control dimmer (generally called incandescent light control) is used in which a switching element (in general, a thyristor element or a triac element) is turned on at a certain phase angle of an alternating-current power supply voltage, and thus it is possible to easily perform, with a single volume element alone, light control on power supply to the incandescent bulb (for example, see JP-A-2005-26142). It is known that, even when a phase control dimmer performs light control on an incandescent bulb, an incandescent bulb whose wattage is low is connected to a dimmer, and thus flickering or flashing occurs, with the result that the light control cannot be properly performed.

When light control is performed on an LED illumination unit using an alternating-current power supply, as in the case where light control is performed on an incandescent bulb, it is preferable to use a phase control dimmer. Here, a conventional example of an LED illumination system that can perform light control on an LED illumination unit using an alternating-current power supply is shown in FIG. 7.

The conventional LED illumination system shown in FIG. 7 includes a phase control dimmer 200, an LED drive circuit 300 and an LED load 400 composed of a plurality of LEDs. The LED drive circuit 300 includes a full-wave rectifier 1 and an LED current control circuit 2. The phase control dimmer 200 is connected in series between an alternating-current power supply 100 and the LED current control circuit 2. When the control (not shown) of a half fixed resistor Rvar is set at a certain position, the phase control dimmer 200 turns on a triac Tri at a power supply phase angle corresponding to the set position. Furthermore, in the phase control dimmer 200, a noise reduction circuit formed with a capacitor CLC and a coil LLC is provided, and thus a terminal noise that is fed back from the phase control dimmer 200 to a power supply line is reduced.

A conventional incandescent bulb illumination system that performs, with a phase control dimmer, light control on an incandescent bulb is shown in FIG. 8. Voltage and current waveforms of portions of the conventional incandescent bulb illumination system shown in FIG. 8 are shown in FIG. 9. When a triac Tri is turned on, a voltage V3 across an incandescent bulb 500 is increased, and a current II starts to flow through the incandescent bulb 500. Then, the triac Tri is kept on until an alternating-current power supply voltage V1 approaches zero volts and the current flowing through the triac Tri reaches a holding current or less.

When the triac Tri within the phase control dimmer 200 is turned on, energy stored in the capacitor CLC flows through the coil LLC, and thus a resonance phenomenon occurs. In a load, such as the incandescent bulb 500 (FIG. 8), that needs a large amount of current, even when oscillation occurs, the triac Tri is not turned off. However, in a load, such as the LED load 400 (FIG. 7), whose load is low, the absolute value of a current flowing thorough the triac Tri reaches a holding current (for example, about 10 mA) or less, with the result that the triac Tri may be turned off.

After the triac Tri is turned off by a resonance phenomenon or the like, a trigger voltage is applied again to the triac Tri, and the triac Tri is turned on again within a half period of the same alternating current (in the case of 50 Hz, 10 ms or less of the half period). Here, the timing when the triac Tri is turned on is not stabilized every half period of the alternating current, and thus energy supplied to the LED load 400 is not stabilized, with the result that flickering occurs in the LED load 400.

SUMMARY OF THE INVENTION

An object of the present invention is to provide an LED drive circuit and an LED illumination unit that can reduce the flickering of an LED.

According to the present invention, there is provided an LED drive circuit that can be connected to an alternating-current power supply through a phase control dimmer and that drives an LED load, the LED drive circuit including: an LED current control circuit; a capacitance component and a resistance component that are connected in series between an input of the LED current control circuit and a reference potential; a switch element that is connected to both ends of the resistance component; and a switch control portion that turns off the switch element for a given period of time after a timing when the phase control dimmer is turned on and that turns on the switch element after the given period of time elapses.

In this configuration, since the switch element is turned off for the given period of time after the timing when the phase control dimmer is turned on, the resistance component is set active, and the energy of the resonance occurring when the phase control dimmer is turned on are consumed by the capacitance component and the resistance component. Hence, since the resonance phenomenon can be reduced, it is possible to prevent the turning off of the phase control dimmer and the malfunction thereof, with the result that it is possible to reduce the flickering of the LED. Moreover, after the given period of time period elapses, the switch element is turned on, and thus the resistance component is bypassed, with the result that it is possible to effectively perform the stabilization function of the LED current control circuit by the capacitance component.

Preferably, in the configuration described above, a detection portion which detects that an output voltage of the phase control dimmer reaches a threshold voltage or less is included, and, when the detection is performed, the switch control portion turns off the switch element.

Preferably, in any one of the configurations described above, the given period of time can be changed according to the phase control dimmer that is connected.

Preferably, in any one of the configurations described above, a detection portion which detects a gradient of an output voltage of the phase control dimmer is included, and the given period of time can be changed according to a detection signal of the detection portion.

According to the present invention, there is provided an LED illumination unit that includes the LED drive circuit of any one of the configurations described above and an LED load connected to the output side of the LED drive circuit.

DETAILED DESCRIPTION OF THE PREFERRED EMBODIMENTS

An embodiment of the present invention will be described below with reference to accompanying drawings. The configuration of an LED illumination system according to the embodiment of the present invention is shown in FIG. 1.

Figure 1:
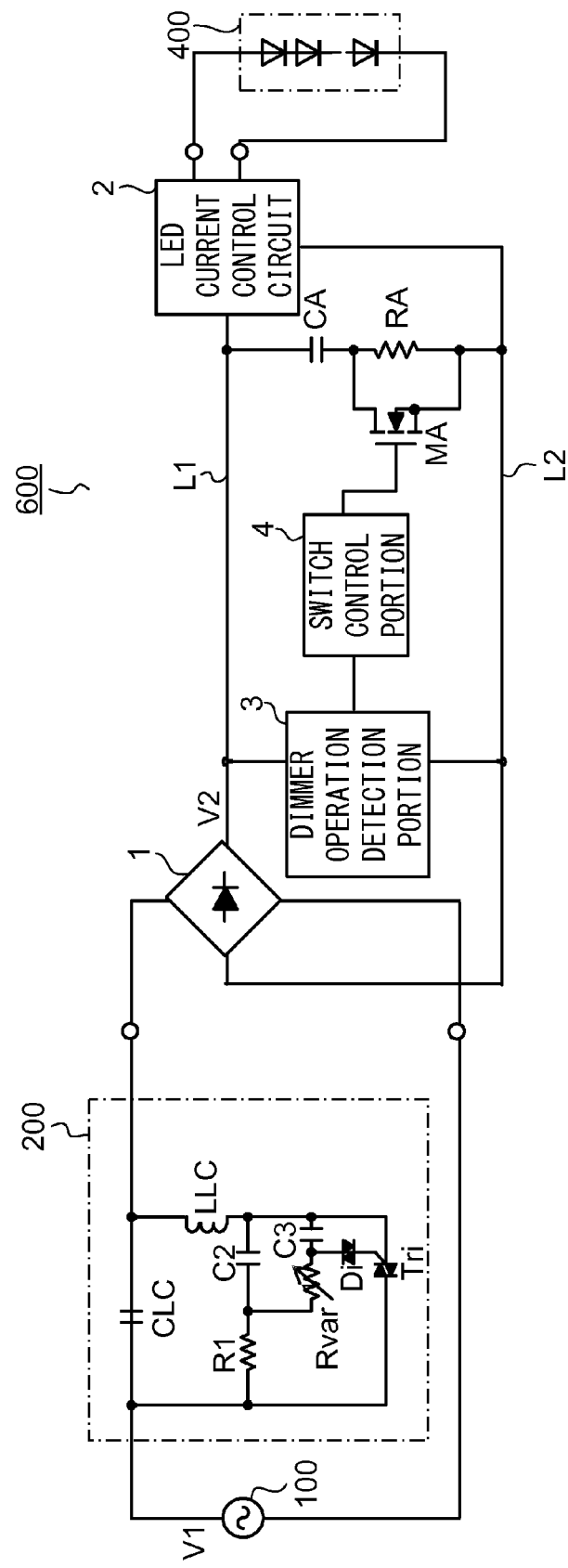
FIG. 1 is a diagram showing the configuration of an LED illumination system according to an embodiment of the present invention.

The LED drive circuit 600 of the LED illumination system shown in FIG. 1 includes a full-wave rectifier 1, an LED current control circuit 2, a dimmer operation detection portion 3, a switch control portion 4, a switch element MA, a discharge capacitor CA and a discharge resistor RA. The LED drive circuit 600 also includes an input line L1 for inputting an input voltage into the LED current control circuit 2 and a reference potential line L2.

Figure 2:
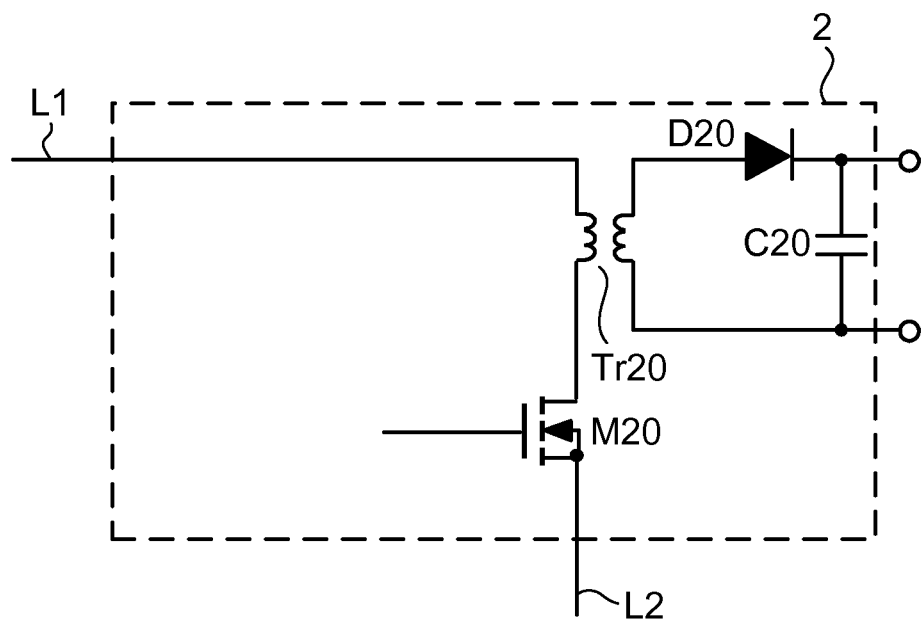
FIG. 2 is a diagram showing an example of the configuration of an LED current control circuit according to the present invention.

The LED current control circuit 2 receives the input voltage through the input line L1, and controls a current flowing through the LED load 400 connected to the output side of the LED current control circuit 2. As an example of the LED current control circuit 2, a flyback converter is shown in FIG. 2. The LED current control circuit 2 shown in FIG. 2 includes a transformer Tr20, a switch element M20, a diode D20 and a capacitor C20. When the switch element 20 is turned on, a current flows through the primary winding of the transformer Tr20, the core of the transformer Tr20 is magnetized by the generated magnetic flux, and energy is stored in the transformer Tr20. Here, an induction current does not flow through the secondary winding of the transformer Tr20. When the switch element M20 is turned off, the energy stored in the core is discharged, and a current flows through the diode D20 to the LED load 400.

With reference back to FIG. 1, the discharge capacitor CA and the discharge resistor RA are connected in series between the input line L1 and the reference potential line L2. If the discharge capacitor CA and the discharge resistor RA are not provided, when the triac Tri within a phase control dimmer (hereinafter simply referred to as a "dimmer") is turned on at a certain phase angle of a voltage V1 of an alternating-current power supply 100, although the energy stored in the capacitor CLC within the dimmer 200 is discharged by the coil LLC and the resistance component of the triac Tri within the dimmer 200, the resistance component of the triac Tri is low (several ohms or less), and thus a resonance phenomenon occurs. The resonance phenomenon causes the current flowing through the triac Tri to oscillate, and the triac Tri is turned off at the timing when the absolute value of the current reaches a holding current or less, with the result that the dimmer 200 may malfunction. Hence, the discharge capacitor CA and the discharge resistor RA are provided, and thus the energy of the resonance is consumed. It is impossible to sufficiently reduce the resonance phenomenon only with the discharge capacitor CA; the triac Tri may be turned off. A loss is produced by the addition of the discharge resistor RA, and thus it is possible to reduce the resonance phenomenon.

Here, in order to prevent the coil LLC within the dimmer 200 and the discharge capacitor CA from producing the resonance phenomenon, formula (1) below is satisfied. Formula (1) is derived under a condition in which the current of a series LCR circuit is not an oscillatory solution by considering an alternating-current equivalent circuit (a voltage source short) composed of only the coil LLC, the discharge resistor RA and the discharge capacitor CA.

$$RA^2 - 4 \times LLC/CA \geq 0 \qquad (1)$$

where RA is the resistance value (Ω) of the discharge resistor RA, LLC is the inductance (μH) of the coil LLC and CA is the capacitance (μF) of the discharge capacitor CA.

For example, when LLC=100 μH and CA=0.2 μF, RA is set at 45Ω or more.

The dimmer operation detection portion 3 is connected between the input line L1 and the reference potential line L2; the switch control portion 4 is connected to the output side of the dimmer operation detection portion 3. The gate of the switch element MA formed with an n-MOS transistor is connected to the output side of the switch control portion 4. The drain and the source of the switch element MA are connected to both ends of the discharge resistor RA.

The discharge capacitor CA smoothes out the input voltage of the LED current control circuit 2, and thereby prevents the malfunction of the LED current control circuit 2 caused by the decrease in the input voltage. In other words, the discharge capacitor CA is a capacitor for stabilizing the LED current control circuit 2. However, when the resistance value of the discharge resistor RA is high, it is impossible to sufficiently use the energy from the discharge capacitor CA, and the input voltage of the LED current control circuit 2 is decreased, with the result that the stabilization function of the LED current control circuit 2 does not work effectively.

Hence, for a given period of time (for example, 200 μs) after the dimmer operation detection portion 3 detects the turning on (that is, the turning on of the triac Tri) of the dimmer 200, the switch element MA is turned off by the switch control portion 4, and thus the discharge resistor RA is set active, with the result that the resonance phenomenon is reduced. Then, after the given period of time elapses, the switch element MA is turned on by the switch control portion 4, and the discharge resistor RA is bypassed, with the result that the discharge capacitor CA is made to effectively function as a capacitor for stabilizing the LED current control circuit 2.

A specific example of the configuration of the dimmer operation detection portion 3 and the switch control portion 4 will now be described.

Figure 3A:
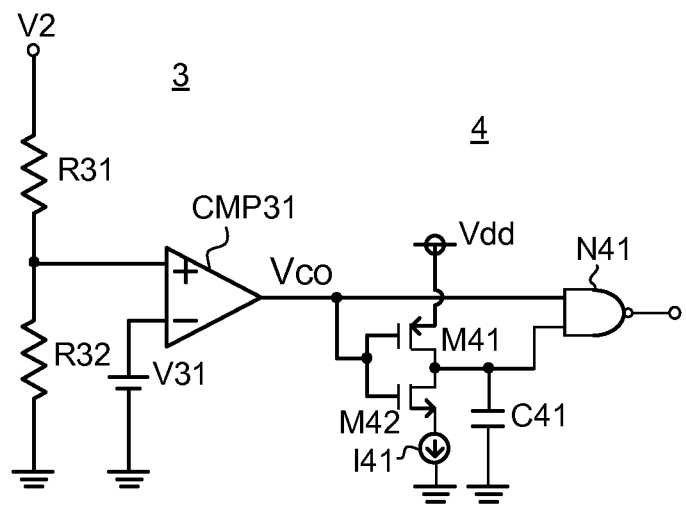
FIG. 3A is a diagram showing the configuration of a dimmer operation detection portion and a switch control portion according to a first example.

A configuration of the dimmer operation detection portion 3 and the switch control portion 4 according to a first example is shown in FIG. 3A. The dimmer operation detection portion 3 shown in FIG. 3A includes a resistor R31, a resistor R32 and a comparator CMP31. The resistor R31 and the resistor R32 are connected in series between the input line L1 and a ground. The connection point between the resistor R31 and the resistor R32 is input to the non-inverting terminal of the comparator CMP31. In other words, a voltage obtained by the division of the output voltage V2 of the full-wave rectifier 1 by the resistors R31 and R32 is input to the non-inverting terminal of the comparator CMP31. A reference voltage V31 is input to the inverting terminal of the comparator CMP31.

For example, if the resistance value of the resistor R31 is set at 3 MΩ, the resistance value of the resistor R32 is set at 300 kΩ and the reference voltage V31 is set at 3 volts, when the output voltage V2 of the full-wave rectifier 1 reaches a threshold voltage of 30 volts or more, the output voltage Vco of the comparator CMP31 is turned high.

The switch control portion 4 includes a switch element M41 formed with a p-MOS transistor, a switch element M42 formed with an n-MOS transistor, a constant current source I41, a capacitor C41 and an NAND circuit N41.

The output of the comparator CMP31 is connected to one input end of the NAND circuit N41, and is connected to the connection point that connects the gates of the switch element M41 and the switch element M42. A power supply voltage Vdd is applied to the source of the switch element 41. The constant current source I41 is connected between the source of the switch element M42 and the ground. The connection point that connects the drains of the switch element M41 and the switch element M42 is connected to one end of the capacitor C41, and is connected to the other input end of the NAND circuit N41. The other end of the capacitor C41 is connected to the ground. The output end of the NAND circuit N41 is connected to the gate of the switch element MA (FIG. 1).

Figure 4A:
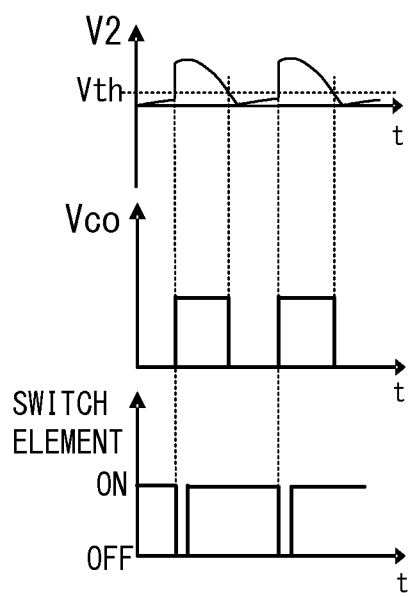
FIG. 4A is a timing chart showing the operation of the dimmer operation detection portion and the switch control portion according to the first example.

A timing chart showing the operation of the dimmer operation detection portion 3 and the switch control portion 4 configured as described above and according to the first example is shown in FIG. 4A. The timing chart of FIG. 4A sequentially shows, from above, the output voltage V2 of the full-wave rectifier 1, the output voltage Vco of the comparator CMP31 and the on-off state of the switch element MA When the triac Tri is turned on, that is, the dimmer 200 is turned on, and the output voltage V2 rises, since the output voltage V2 is equal to or more than a threshold voltage Vth, the output voltage Vco of the comparator CMP31 is turned high. Here, since the capacitor C41 is charged, the two inputs of the NAND circuit N41 are turned high, and the output of the NAND circuit N41 is turned low, with the result that the switch element MA is switched from on to off.

Since the output voltage Vco is high, the switch element M41 is turned off, and the switch element M42 is turned on. Then, the capacitor C41 starts discharge by the constant current source I41. A given period of time after the discharge, the input of the NAND circuit N41 on the side of the capacitor C41 is turned low, and the output of the NAND circuit N41 is turned high and the switch element MA is turned on.

Thereafter, when the output voltage V2 reaches the threshold voltage Vth or less, the output voltage Vco of the comparator CMP31 is turned low, and the switch element MA is kept on. Here, since the switch element M42 is turned off, and the switch element M41 is turned on, the capacitor C41 is charged by the power supply voltage Vdd. Thereafter, when the output voltage Vco is turned high by the turning on of the dimmer 200, the output of the NAND circuit N41 is turned low, and the switch element MA is turned off. Thereafter, the same operation is repeated.

When the turning on of the dimmer 200 is detected as described above, the switch element MA is switched from on to off, the discharge resistor RA is set active and the resonance phenomenon when the dimmer 200 is on is reduced. Hence, the turning off of the triac Tri and the malfunction of the dimmer 200 are prevented, with the result that it is possible to reduce the flickering of the LED. A given period of time after the switch element MA is switched to off, since the switch element MA is turned on, the discharge resistor RA is bypassed, with the result that it is possible to effectively perform the stabilization function of the LED current control circuit 2 by the discharge capacitor CA.

Figure 3B:
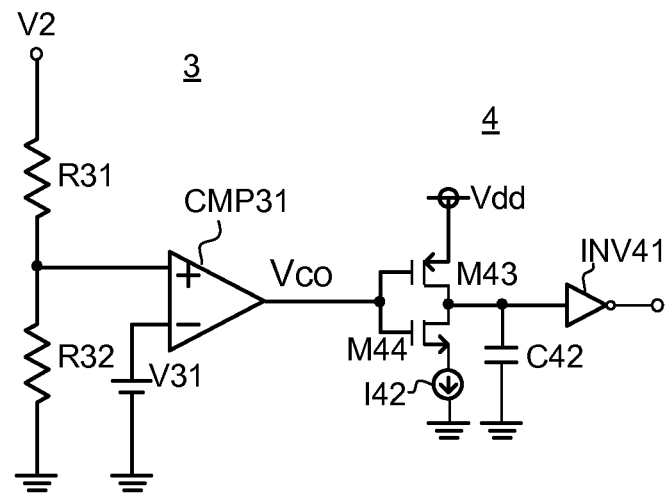
FIG. 3B is a diagram showing the configuration of a dimmer operation detection portion and a switch control portion according to a second example.

A configuration of the dimmer operation detection portion 3 and the switch control portion 4 according to a second example is shown in FIG. 3B. The dimmer operation detection portion 3 shown in FIG. 3B has the same configuration as that of the dimmer operation detection portion 3 described above, shown in FIG. 3A and according to the first example. The configuration of the switch control portion 4 shown in FIG. 3B is different from that of the first example.

The switch control portion 4 shown in FIG. 3B includes a switch element M43 formed with a p-MOS transistor, a switch element M44 formed with an n-MOS transistor, a constant current source I42, a capacitor C42 and an inverter INV41.

The output of the comparator CMP31 is connected to the connection point that connects the gates of the switch element M43 and the switch element M44. The power supply voltage Vdd is applied to the source of the switch element 43. The constant current source I42 is connected between the source of the switch element M44 and the ground. The connection point that connects the drains of the switch element M43 and the switch element M44 is connected to one end of the capacitor C42, and is connected to the input end of the inverter INV41. The other end of the capacitor C42 is connected to the ground. The output end of the inverter INV41 is connected to the gate of the switch element MA (FIG. 1).

Figure 4B:
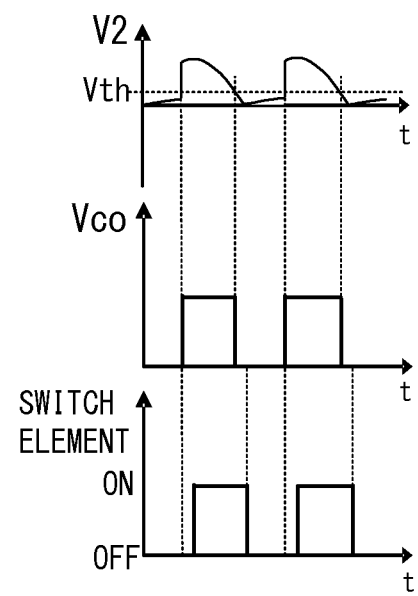
FIG. 4B is a timing chart showing the operation of the dimmer operation detection portion and the switch control portion according to the second example.

A timing chart showing the operation of the dimmer operation detection portion 3 and the switch control portion 4 configured as described above and according to the second example is shown in FIG. 4B. The timing chart of FIG. 4B sequentially shows, from above, the output voltage V2 of the full-wave rectifier 1, the output voltage Vco of the comparator CMP31 and the on-off state of the switch element MA.

First, the capacitor C42 is charged, the output of the inverter INV41 is low and the switch element MA is off. When the triac Tri is turned on, that is, the dimmer 200 is turned on, and the output voltage V2 rises, since the output voltage V2 is equal to or more than the threshold voltage Vth, the output voltage Vco of the comparator CMP31 is turned high. Here, since the switch element M43 is turned off, and the switch element M44 is turned on, the discharge from the capacitor C42 is started by the constant current source I42. Here, the switch element MA is kept off.

Then, after a given period of time elapses, when the output of the inverter INV41 is turned high by the discharge, the switch element MA is turned on. Thereafter, when the output voltage V2 reaches the threshold voltage Vth or less, the output voltage Vco of the comparator CMP31 is turned low, the switch element M43 is turned on and the switch element M44 is turned off. Thus, the charging of the capacitor C42 is started by the power supply voltage Vdd. Thereafter, when the output of the inverter INV41 is turned low by the charge, the switch element MA is turned off.

Thereafter, the switch element MA is kept off, and the dimmer 200 is turned on. Thereafter, the same operation is repeated.

As described above, in the second example, when the output voltage V2 of the full-wave rectifier 1 reaches the threshold voltage Vth or less, the switch element MA is turned off, and, the given period of time after the dimmer 200 is turned on, the switch element MA is turned on. Thus, it is possible to reliably keep the switch element MA off at the timing when the dimmer 200 is turned on. It is therefore possible to reliably set the discharge resistor RA active and reduce the resonance phenomenon at the timing when the dimmer 200 is turned on.

The setting of the threshold voltage Vth in the second example will be described; even when the triac Tri is off, the output voltage V2 of the full-wave rectifier 1 is produced by the capacitance coupling of the capacitor CLC within the dimmer 200. For example, if it is assumed that the capacitance of the capacitor CLC is 0.1 μF and the frequency of the alternating current is 60 Hz, the impedance of the capacitor CLC is $1/(2\pi \times 60 \text{ Hz} \times 0.1 \text{ μF}) = 26 \text{ k}\Omega$. If the impedance of a portion succeeding the full-wave rectifier 1 is assumed to be 1 kΩ, even when the triac Tri is off, the output voltage V2 one-twenty sixth as high as the alternating voltage is produced. For example, when the RMS value of the alternating-current voltage is 120 volts, an output voltage V2 of 6.5 volts ($120 \times \sqrt{2}/26 = 6.5$ volts) is produced. Hence, when the output voltage V2 is 6.5 volts or less, the dimmer 200 is determined to be off, and a voltage of 6.5 volts is set as the threshold voltage. A voltage of 30 to 50 volts including a margin may be set as the threshold voltage.

<First Variation>

Figure 5:
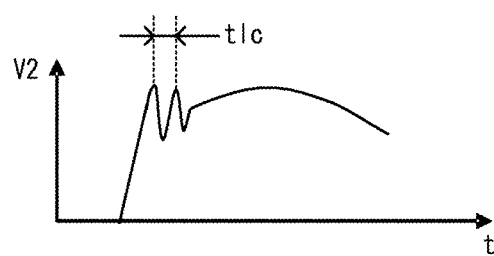
FIG. 5 is a diagram showing an example of the waveform of an output voltage of a full-wave rectifier.

The following variation is possible. A time period t1c (see FIG. 5) of an oscillation phenomenon occurring when the dimmer 200 is on is expressed by an equation "$t1c = 2 \times \pi \sqrt{(C \times L)}$" where C is the combination capacitance (F) of the discharge capacitor CA and the capacitor CLC and L is the inductance (H) of the coil LLC.

Since the circuit constants of the capacitor CLC and the coil LLC depend on the type of dimmer 200, the time period t1c of the oscillation phenomenon is changed according to the type of dimmer 200, and thus the time during which the oscillation phenomenon occurs is changed. As a given period of time during which the switch element MA is turned off since the timing when the dimmer 200 is turned on in the embodiment described above, the time during which the oscillation phenomenon occurs is needed. Hence, the given period of time is set that it can be preferably changed according to the dimmer 200.

Specifically, preferably, an IC that detects the circuit constants of the capacitor CLC and the coil LLC within the dimmer 200 is provided, and thus the IC can change, according to the detected circuit constants, the constant current value of the constant current source I41 or I42 (FIG. 3A or 3B) in the switch control portion 4.

Preferably, a hard switch is provided, and a user switches the hard switch according to the dimmer 200 that is connected, and thus the constant current value of the constant current source I41 or I42 in the switch control portion 4 is set such that it can be changed.

<Second Variation>

Although the output voltage V2 of the full-wave rectifier 1 rises at the timing when the dimmer 200 is turned on, the gradient thereof depends on the circuit constants of the capacitor CLC and the coil LLC within the dimmer 200. When the output voltage V2 rises sharply, the given period of time during which the switch element MA is turned off since the timing at which the dimmer 200 is turned on in the embodiment described above is reduced whereas, when the output voltage V2 rises gently, the given period of time is increased, and thus it is possible to make the given period of time appropriate.

Figure 6:
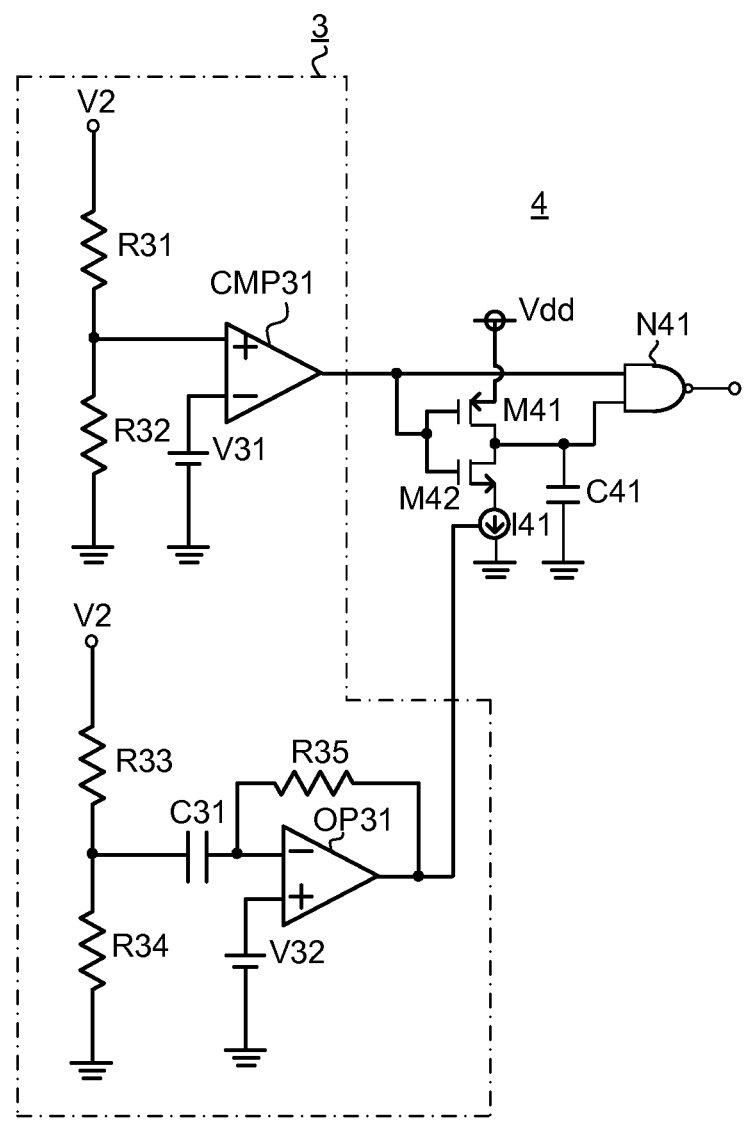
FIG. 6 is a diagram showing the configuration of a dimmer operation detection portion and a switch control portion according to a second variation.
Figure 7:
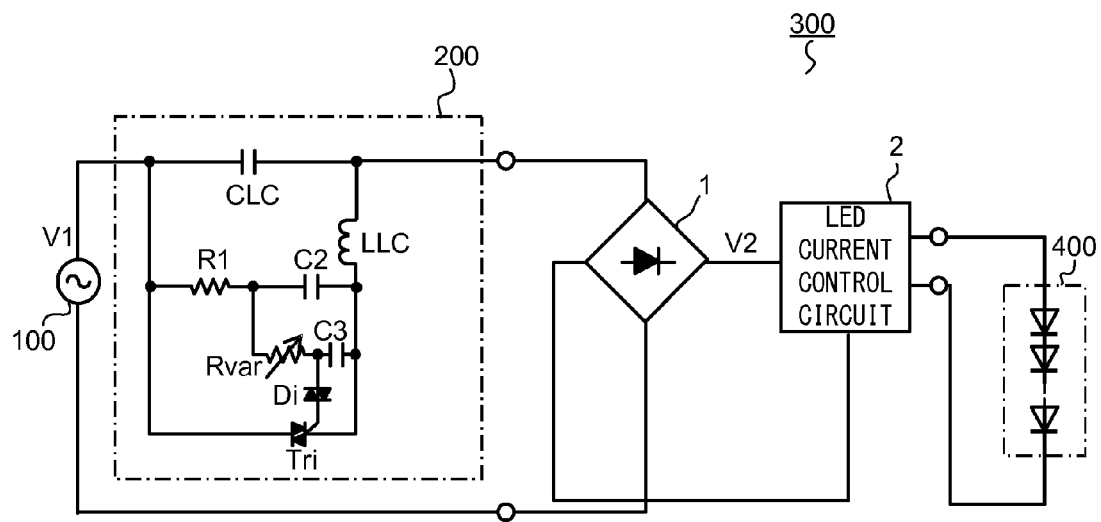
FIG. 7 is a diagram showing a conventional example of an LED illumination system.
Figure 8:
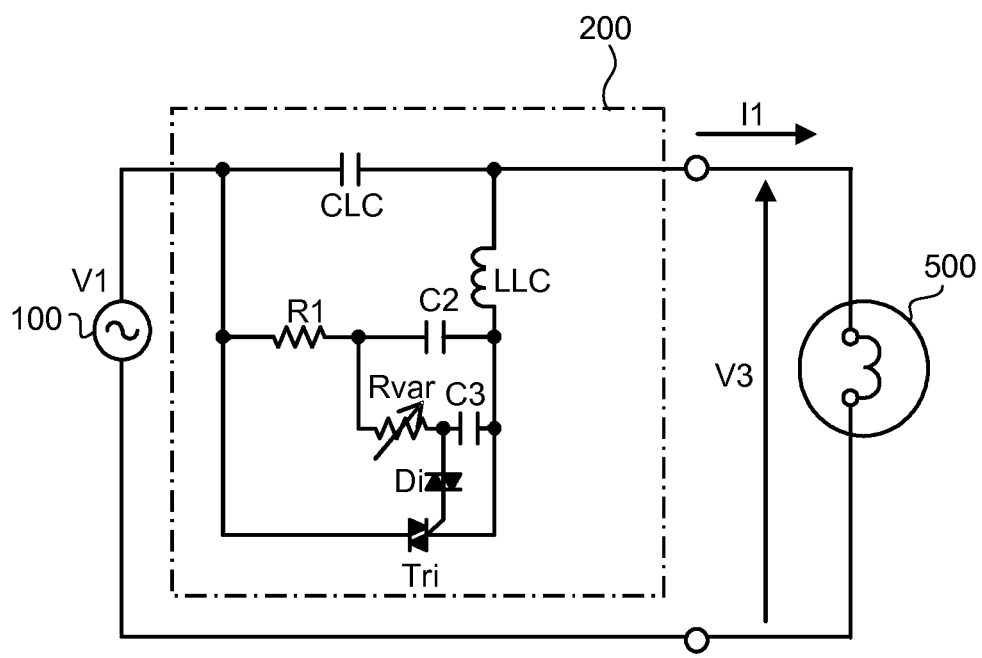
FIG. 8 is a diagram showing a conventional example of an incandescent bulb illumination system.
Figure 9:
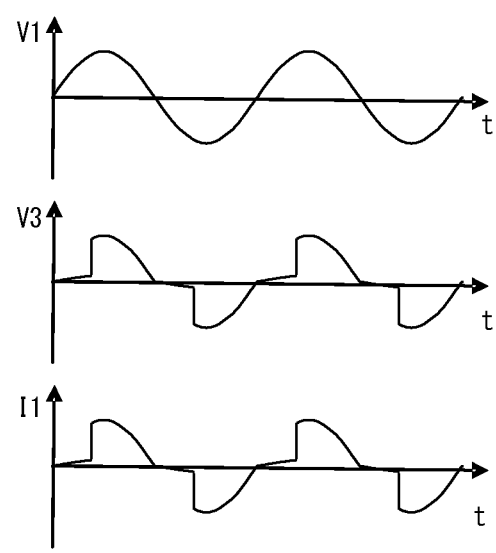
FIG. 9 is a timing chart of the voltage and current of portions in the conventional example of the incandescent bulb illumination system.

The configuration of the dimmer operation detection portion 3 according to a second variation is shown in FIG. 6. The dimmer operation detection portion 3 shown in FIG. 6 includes not only the dimmer operation detection portion 3 according to the first example (FIG. 3A) described above but also a differentiating circuit. The differentiating circuit is formed with a resistor R33, a resistor R34, a capacitor C31, a resistor R35 and an operational amplifier OP31.

The resistors R33 and R34 are connected in series between the input line L1 and the ground. The connection point between the resistor R33 and the resistor R34 is connected to one end of the capacitor C31. The other end of the capacitor C31 is connected to the inverting terminal of the operational amplifier OP31 and is connected to one end of the resistor R35. A reference voltage V32 is input to the non-inverting terminal of the operational amplifier OP31. The output end of the operational amplifier OP31 is connected to the other end of the resistor R35, and is connected to the constant current source I41.

The gradient of the rising of the output voltage V2 when the dimmer 20 is turned on can be detected by the differentiating circuit. Then, the constant current value of the constant current source I41 is set such that it can be changed according to a detection signal output from the differentiating circuit. Thus, it is possible to make appropriate the given period of time during which the switch element MA is turned off, according to the dimmer 200 that is connected.

An embodiment may be employed in which the dimmer operation detection portion 3 includes not only the dimmer operation detection portion 3 according to the second example (FIG. 3B) described above but also the differentiating circuit. In this case, the constant current value of the constant current source I42 is set such that it can be changed according to the detection signal of the differentiating circuit.

The embodiment of the present invention has been described above; examples of the LED illumination unit including the LED drive circuit according to the present invention and the LED load include an LED bulb.

What is claimed is:

1. An LED drive circuit that can be connected to an alternating-current power supply through a phase control dimmer and that drives an LED load, the LED drive circuit comprising:
   an LED current control circuit;
   a capacitance component and a resistance component that are connected in series between a power input line for inputting electric power to the LED current control circuit and a reference potential;
   a switch element that is connected to both ends of the resistance component and that operates such that, when the switch element is off, the resistance component is set active and, when the switch element is on, the resistance component is bypassed; and a switch control portion
that turns off the switch element at a same time that the phase control dimmer is turned on, then keeps the switch element off for a given period of time, and turns on the switch element after the given period of time elapses, or
that keeps the switch element off for a given period for time from a time point that the phase control dimmer is turned on and turns on the switch element after the given period of time elapses.

2. The LED drive circuit of claim 1, further comprising:
a detection portion which detects that an output voltage of the phase control dimmer reaches a threshold voltage or less,
wherein, when the detection is performed, the switch control portion turns off the switch element.

3. The LED drive circuit of claim 1,
wherein the given period of time can be changed according to the phase control dimmer that is connected.

4. The LED drive circuit of claim 1, further comprising:
a detection portion which detects a gradient of an output voltage of the phase control dimmer,
wherein the given period of time can be changed according to a detection signal of the detection portion.

5. An LED illumination unit comprising:
an LED drive circuit that can be connected to an alternating-current power supply through a phase control dimmer and that drives an LED load, the LED drive circuit including:
an LED current control circuit;
a capacitance component and a resistance component that are connected in series between a power input line for inputting electric power to the LED current control circuit and a reference potential;
a switch element that is connected to both ends of the resistance component and that operates such that, when the switch element is off, the resistance component is set active and, when the switch element is on, the resistance component is bypassed; and
a switch control portion
that turns off the switch element at a same time that the phase control dimmer is turned on, then keeps the switch element off for a given period of time, and turns on the switch element after the given period of time elapses, or
that keeps the switch element off for a given period of time from a time point that the phase control dimmer is turned on and turns on the switch element after the given period of time elapses; and
the LED load that is connected to an output side of the LED drive circuit.

6. The LED illumination unit of claim 5,
wherein the LED drive circuit includes a detection portion which detects that an output voltage of the phase control dimmer reaches a threshold voltage or less, and, when the detection is performed, the switch control portion turns off the switch element.

7. The LED illumination unit of claim 5,
wherein the given period of time can be changed according to the phase control dimmer that is connected.

8. The LED illumination unit of claim 5,
wherein the LED drive circuit includes a detection portion which detects a gradient of an output voltage of the phase control dimmer, and the given period of time can be changed according to a detection signal of the detection portion.

* * * * *